Sept. 6, 1966     R. M. WOLF     3,271,653
NON-STICK METALLIC COOKING VESSEL
Filed Aug. 22, 1961     2 Sheets-Sheet 1
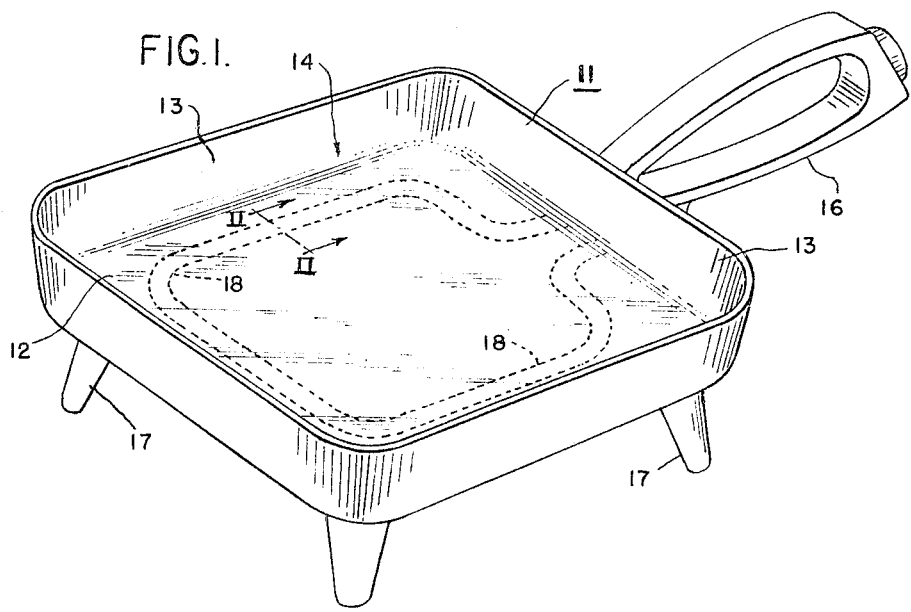
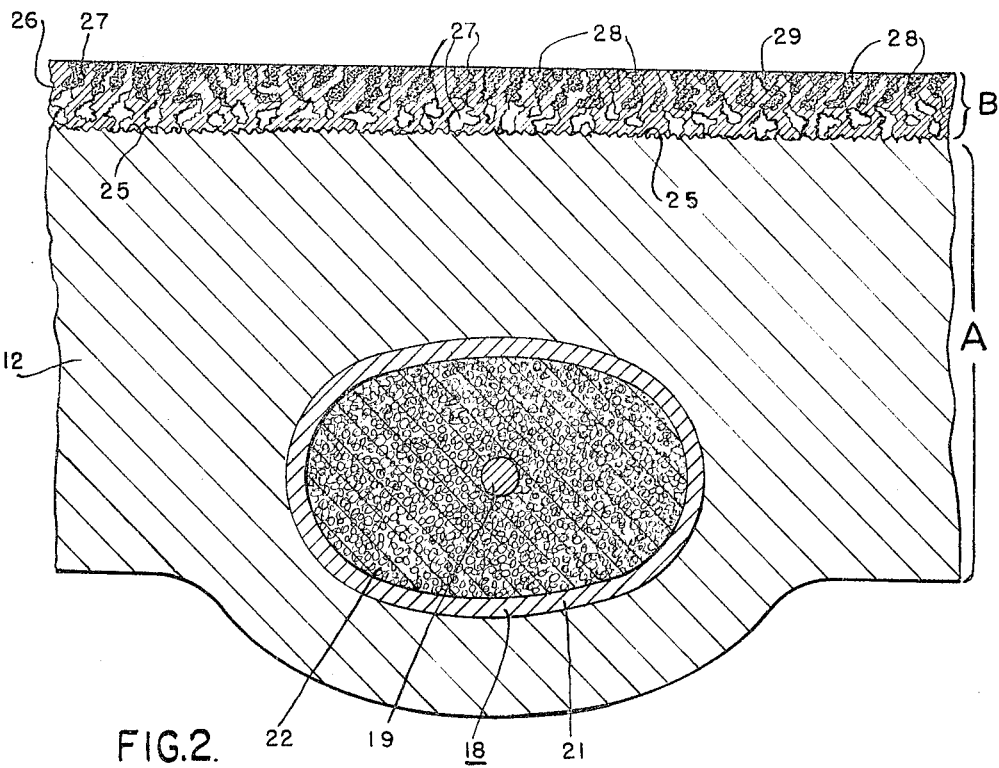
INVENTOR
ROBERT M. WOLF
BY Ralph T. French
ATTORNEY United States Patent Office 3,271,653
Patented Sept. 6, 1966

3,271,653
NON-STICK METALLIC COOKING VESSEL
Robert M. Wolf, Mansfield, Ohio, assignor to Westinghouse Electric Corporation, East Pittsburgh, Pa., a corporation of Pennsylvania
Filed Aug. 22, 1961, Ser. No. 133,103
1 Claim. (Cl. 220—64)

This invention relates to articles of manufacture of the type having surfaces to which foreign materials tend to stick during normal use of the articles, for example, cooking vessels, oven liners, irons, etc., and relates more particularly to novel surfaces for such articles which surfaces have the characteristic that foods and other foreign materials will not stick thereto, such surfaces being referred to in the trade as non-stick surfaces. The invention has for an object to provide an improved and long-lasting non-stick surface.

This invention further relates to novel methods for obtaining the above-mentioned non-stick surfaces.

While non-stick surfaces, obtained in accordance with the present invention, have particular utility in connection with the cooking surfaces of cooking vessels, for example, frypans, waffle irons, griddles, coffee makers and the like, they are also applicable to other heated articles such as oven liners and the bottom surfaces of flat irons, and even in connection with articles which are not heated, for example, the under surfaces of rotary lawn mower casings to which grass cuttings tend to adhere. For convenience, such vessels and articles may be referred to as domestic appliances.

Cooking vessels have been marketed heretofore which were provided with a non-stick coating overlying the cooking surface of the vessel. Both silicones and fluorocarbons have been used as the non-stick agents for such coatings, but all such coatings which overlie the metal cooking surface are subject to the objection that they the relatively temporary in nature in that they wear off after a few months of use. Some manufacturers of silicone coated vessels make provisions for return of the vessel to the factory for recoating when needed. However, this not only involves extra periodic expense to the owner of the vessel, but also results in considerable inconvenience in that the owner is without the use of the vessel during the period required for the recoating and for the transportation time to and from the factory. Some manufacturers of vessels coated with fluorocarbon nonstick agents make no provisions for recoating, but may provide a wooden spatula with each vessel to delay arrival of the day when the non-stick coating is gone.

It has also been proposed to provide a cooking vessel with a sintered porous metal cooking surface capable of retaining and exuding fatty ingredients when heated, to prevent sticking of food being cooked. However, this is not as satisfactory as surfaces constructed in accordance with the present invention. Surfaces rendered nonsticking by exuded fatty ingredients tend to stain and discolor, resulting in an unsightly condition.

Non-stick surfaces constructed and prepared in accordance with the present invention are permanent in nature, do not discolor to the same degree, and provide additional advantages not previously available, as will be explained hereinafter.

Basically, the present invention involves the addition, to a surface to be rendered non-sticking, of a thin sprayed layer which is both permanent and porous, this porous layer being impregnated with a suitable non-stick agent. Thus, there is provided a layer of non-stick agent which is protected from injury or destruction by the structure of the permanent porous layer in whose pores it is disposed. Yet, because of the porosity of the impregnated layer, a sufficient amount of the non-stick agent is exposed to and supports the food or other material to prevent sticking of said food or other material to the impregnated layer.

An object of the invention is to provide a permanent non-stick surface.

Another object of the invention is to effect uniform dispersion to the cooking surface of a cooking vessel of heat applied to the vessel in a non-uniform pattern.

Yet another object of the invention is to protect from injury a layer of a non-stick agent.

An additional object of the invention is to provide a novel method of securing fluorocarbons to metal surfaces.

Further objects of the invention are to provide novel methods for obtaining the above-mentioned non-stick surfaces.

The foregoing and other objects are effected by the invention as will be apparent from the following description taken in connection with the accompanying drawings, forming a part of this application, in which:

FIG. 1 is a perspective view of a cast electric frypan constructed in accordance with the present invention;

FIG. 2 is an enlarged fragmentary sectional view, taken along the line II—II of FIG. 1, looking in the direction indicated by the arrows;

Figure 3:
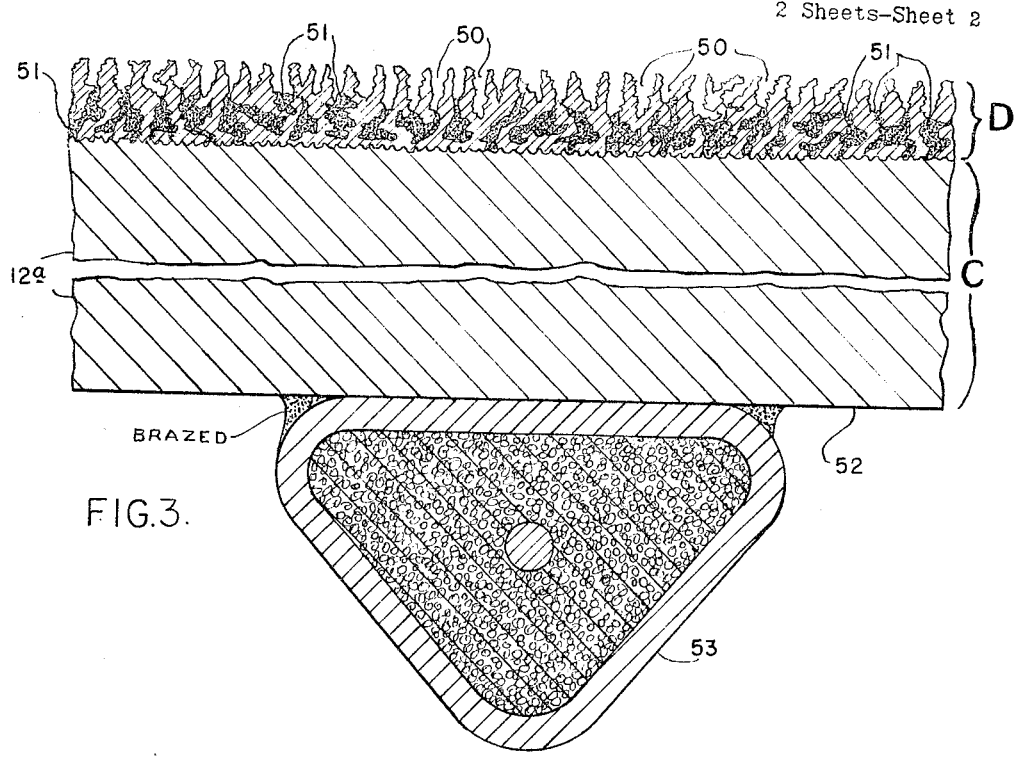
FIG. 3 is an enlarged fragmentary sectional view, similar to FIG. 2, showing a fabricated construction of frypan with the non-stick surface in an intermediate stage of manufacture; and, FIG. 4 is an enlarged fragmentary sectional view showing the frypan of FIG. 3 with its non-stick surface in its final form.

As previously mentioned, non-stick surfaces of the present invention find utility in various fields, and have particular utility in connection with cooking apparatus wherein it is desirable to prevent sticking of food or other material to heated surfaces, both where the heated surface is a cooking surface, as in frypans, waffle irons, etc., and where the heated surface is not directly involved with cooking, as the walls of ovens to which food spatters adhere and the ironing surfaces of irons to which starch from clothes being ironed sticks.

For purposes of illustration only, and not by way of limitation, the invention is herein shown in connection with an electric frypan, it being understood that the novel non-stick surface illustrated in connection with the frypan of the drawings is applicable to other devices and articles of manufacture.

The frypan shown in FIG. 1 has a cast metallic body 11 including a bottom wall 12 and integral side walls 13 extending upwardly from the periphery thereof and defining therewith a food receiving and cooking well 14. Aluminum is a satisfactory metal from which to cast or fabricate the body 11, and other metals are also satisfactory for this purpose.

A handle 16 of plastic or other material which is a poor conductor of heat is secured to the body at one side thereof, as is conventional. A plurality of feet 17 also preferably made of a non-heat conducting material, such as plastic, serve to support the body 11 in vertically spaced relation to any surface on which the frypan is placed.

The frypan is provided with an electrical resistance heating element 18 which may be of any desired type or construction. As herein illustrated, the heating element is of the tubular sheathed type comprising an electrical resistance wire 19 disposed in spaced relation to the surrounding wall of a tubular sheath 21. This spaced relationship of the wire 19 and sheath 21 is maintained by a body 22 of suitable electrical insulating material, for example, magnesium oxide. The heating element 18 is arranged within the bottom wall 12 of the frypan and may be arranged with respect to the side walls 13 in the manner illustrated by the dotted lines in FIG. 1. Electrical current may be supplied to the heating element 18, and the supply thereof controlled by any well known suitable means.

Referring now to the vertical sectional view of FIG. 2, that portion of the bottom wall 12 which is bracketed at A constitutes the original base material, while the portion bracketed at B constitutes the permanent non-stick surface of the present invention. In this figure the portion A is magnified roughly twenty times actual thickness, while the portion B is magnified roughly one-hundred times, to clearly illustrate novel features of the invention.

The upper surface 25 of the base material A is thoroughly cleaned and slightly roughened where a sufficient degree of roughness does not result from the original casting operation and additional roughening may be effected by etching with acid or by shot or sand blasting. For reasons of cost, blasting is preferred and is entirely satisfactory.

A thin coating or layer 26 of a material taken from the class consisting of aluminum and its alloys, copper and alloys thereof, copper-nickel alloys and iron and alloys thereof is sprayed onto the roughened surface 25. In addition to the above-mentioned metals and alloys, glass may be found to be satisfactory, or any material providing a permanent porous layer.

Various thicknesses of the sprayed layer 26 have been tried and found satisfactory, from a minimum of .002 of an inch to .015 of an inch. Thicknesses in excess of .015 of an inch appear to offer no advantages over thinner layers, and merely increase costs and weights of the coated articles.

The application of the listed materials by spraying results in a porous layer, and varying degrees of porosity are satisfactory, within the range of ten to sixty percent porosity. To facilitate illustration of the novel non-stick surface of the present invention, a relatively high degree of porosity has been shown in the drawings.

The pores 27 are substantially filled with a suitable non-stick material or agent 28, for example, fluorocarbon polymers, fluorocarbon telemers, silicone resins, or other non-stick agents which do not deteriorate with use. By way of example, one polytetrafluoroethylene resin which is readily available is sold under the trade name "Teflon."

After impregnation of the porous layer 26 with the selected non-stick agent 28, the latter is cured (with or without the application thereto of heat) for the necessary period of time which may vary with different non-stick agents.

While the non-stick agent 28 may be applied in sufficient quantity to provide a thin body of the agent above the uppermost points of the sprayed coating 26, it is preferable that, after curing, the surface 29 be buffed to remove all excess non-stick agent above the sprayed coating 26, so that the finished or final surface 29 comprises mainly areas of the non-stick agent surrounding points or "islands" of the sprayed material. The points or minute areas of sprayed material are sufficiently numerous and close together to prevent damage to, or removal of, the non-stick agent when the surface 29 is scoured by harsh abrasives or scraped by metal utensils.

An advantage of the above described non-stick surface is that it provides a moisture proof seal for the base material. Consequently, in that no moisture can penetrate to the base material or the metal sprayed material, no electrolytic action can take place either between sections of the base material, between the base material and the metallic sprayed material or between either the base metal, the metallic sprayed material and the acid or alkali solutions contained in the foods being processed. Thus, the impervious coating of the inactive non-stick material prevents normal deterioration experienced in conventional cookware.

A further advantage of the non-stick surface of this invention lies in the fact that the non-stick layer or coating B (FIG. 2) acts as a thermal barrier, reducing any concentration of heat in the area immediately overlying the heating element 18. The layer B functions to distribute the heat from the heating element to all portions of the bottom wall 12, thus substantially reducing hot spots or areas at the cooking surface.

The above discussed non-stick agents have the desirable characteristic of resisting discoloration from staining or chemical changes in the materials.

The present invention includes novel methods by which the above disclosed non-stick surfaces may be produced.

In accordance with one of these methods, the surface to be rendered non-sticking is sand or shot blasted to roughen it and is then degreased with a cleaner such as trichlorethylene or butylacetate. The roughened and cleaned surface is then spray coated with one of the previously mentioned materials such as aluminum, aluminum oxide, alloys, glass, etc. The selected material in wire or powder form is melted and sprayed by an oxyacetylene or oxyhydrogen torch or by a torch wherein the gas is passed through a constricted electric arc, commonly known as Plasma Jet. Due to the characteristics of such metal spraying, the sprayed coating will be porous, yet permanently united with the base material. The sprayed porous coating is cleaned by proper procedures, for example, air blasting.

The porous coating is vacuum impregnated with one of the previously mentioned non-stick agents such as a fluorocarbon polymer or telemer, a silicon resin, or any other relatively high temperature non-stick agent. This vacuum impregnation may be effected by pouring or painting a liquid form of the non-stick agent on the prepared porous surface, drawing a partial vacuum over the surface, vibrating the surface to assure complete coverage thereof by the non-stick agent, and thereafter releasing the partial vacuum to force the non-stick agent into the pores of the sprayed coating. Any excess non-stick agent is poured off and the impregnated surface allowed to dry. The non-stick agent in the pores is then cured by submission to the necessary temperature for the required time, in accordance with recommendations of the supplier thereof.

An optional step in the method is to lightly buff the surface to remove all excess material and any rough spots.

Another optional step is to apply an additional uniform coat of the non-stick agent in overlying relation to the impregnated layer, before the curing step. While this will add little to the non-stick characteristics, it will give the finished surface a more uniform appearance.

It will be apparent that under some conditions, one or more of the steps of the method may be omitted. For example, the initial sand or shot blasting may not be necessary where the surface of the base casting is already sufficiently rough to give a good bond between the base casting and the sprayed layer.

Also, one or more of the cleaning steps may not be necessary where sufficient care has been taken to prevent contamination of the surfaces.

A second method of preparing the non-stick surface of the present invention involves sand or shot blasting the surface to be rendered non-sticking, cleaning the blasted surface with a material such as trichlorethylene or butylacetate and spraying the cleaned and blasted surface with one of the porous-layer-forming materials previously mentioned, such as aluminum, aluminum oxide, alloys, glass, etc. As in the previously mentioned process, the selected material in wire or powder form is melted and sprayed by an oxyacetylene or oxyhydrogen torch or by a torch wherein the gas is passed through a constricted electric arc, commonly known as Plasma Jet. At the same time that this porous-layer-forming material is sprayed onto the roughened surface, the same surface is sprayed with the no-stick agent in either liquid, powder or wire form. The two sprays are so coordinated that the heat from the porous-layer-forming material will cure the non-stick agent at the latter strikes the surface to be coated. As various coats are sprayed, the porous-layer-forming material displaces the non-stick agent and this displaced agent fills the pores in the porous-layer-forming material. Thus, when the combined spray operation is completed, there is provided a porous metallic or glass surface whose pores are impregnated with a non-stick agent which is already cured.

As an optional step, the surface of the combined sprayed layer may be buffed lightly to remove excess material and rough spots.

A third method which produces a somewhat less satisfactory but considerably cheaper non-stick surface involves the steps of sand or shot blasting the surface to be rendered non-sticking to produce a degree of roughness simulating porosity, cleaning the roughened surface, applying a uniform coat of non-stick agent to the roughened and degreased surface, curing the non-stick agent by the submission thereof to elevated temperature in accordance with instructions of the supplier, and buffing the surface until peaks of sand blasted original surface begin to break through the layer of non-stick agent. These peaks of base metal serve as protection for the non-stick agent to prevent gouging or abrasion thereof during scraping or scouring of the non-stick surface.

In both methods two and three, the cleaning steps may be omitted when practical, as in method one.

The depth of impregnation obtained by the vacuum steps of methods I and II is determined, to a considerable extent, by the degree of vacuum produced in performing the vacuum impregnating step. While there is no problem in obtaining impregnation to the full depth of the porous layer in laboratory trials, in actual shop mass production procedure full depth impregnation may be expensive to obtain solely by vacuum impregnation.

This problem is eliminated by a fourth method which involves spraying through a single nozzle a mixture of the inert metal and the non-stick agent, for example, powdered aluminum and a powdered flurocarbon. One such mixture which has been found suitable is five parts aluminum powder and one part fluorocarbon powder by weight, or approximately 84% aluminum powder and 16% fluorocarbon powder by volume. However, varying ratios of metal powder to non-stick powder will be satisfactory.

During the spraying of this mixture a partially impregnated layer D (FIG. 3) is gradually deposited which layer is relatively dense in the inner portion thereof adjacent the base metal C where all of the pores or voids in the aluminum are filled with the fluorocarbon 51. The outer portion of this sprayed layer contains voids or pores 50 which are not filled with fluorocarbon.

Figure 4:
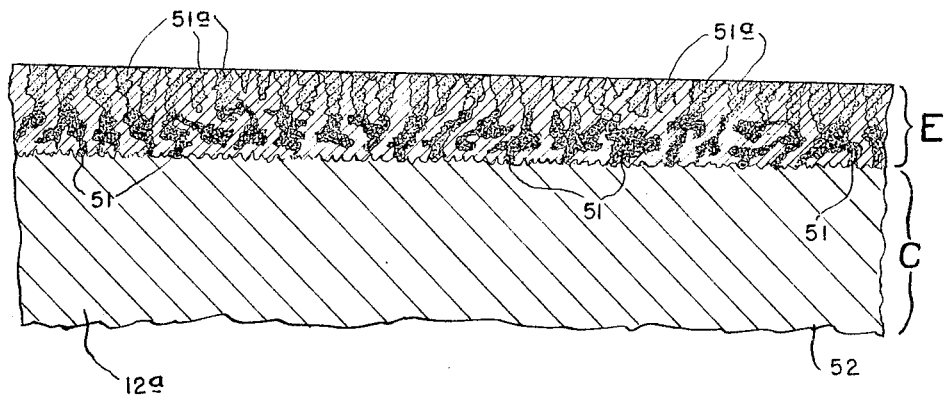

This partially impregnated layer of sprayed mixture (illustrated in FIG. 3) is vacuum impregnated with liquid fluorocarbon or other selected non-stick agent 51a in liquid form to complete the impregnation of the voids 50 in the outer portion thereof, thereby producing a substantially completely impregnated sprayed layer, such as illustrated at E in FIG. 4.

This vacuum impregnation of the voids 50 is effected by drawing a vacuum on the pan interior, drawing liquid non-stick agent into the evacuated pan until the latter is filled, allowing the liquid non-stick agent to saturate the porous pan surface to completely fill the voids 50, draining the unabsorbed liquid non-stick agent from the pan, cleaning out the excess non-stick agent and curing the non-stick agent retained in the voids.

If for any reason one vacuum impregnation as set forth above does not completely fill the voids 50, the vacuum treatment may be repeated as often as necessary to effect complete filling of the voids.

In the construction of FIGS. 3 and 4 a fabricated frypan has been shown, the base 12a thereof comprising the bottom wall 52 of the pan and having brazed thereto a conventional resistance tubular heating element 53.

It will be apparent that, by use of any of the methods set forth above, there can be produced a novel and extremely useful non-stick surface, suitable for many applications.

Where the term "permanent" is used in this specification and in the claim, in reference to a non-stick surface or to a non-stick agent, it means such a surface or agent which has a useful life comparable with the normal useful life of the article to which such surface or agent is applied.

Reference is made to copending application Serial No. 212,885, filed July 27, 1962, and now abandoned for Non-Stick Surface, by Julian Wisnicki and assigned to the assignee of the present application, wherein it is disclosed that non-stick surfaces obtained by the methods herein disclosed may be further treated by shot peening to render such surfaces smoother, harder, and of less total porosity.

While the invention has been shown in several forms, it will be obvious to those skilled in the art that it is not so limited, but is susceptible of various other changes and modifications without departing from the spirit thereof.

What is claimed is:

A metallic cooking vessel having a cooking surface consisting of a thin porous layer of aluminum permanently united to the base metal of the vessel, said base metal being aluminum and said thin porous aluminum layer being impregnated with a permanent non-stick agent and the food engaging surface of said impregnated porous aluminum layer comprising minute areas of the porous aluminum surrounded by areas of the non-stick agent.

References Cited by the Examiner

UNITED STATES PATENTS

| | | | |
|---|---|---|---|
| 1,570,929 | 1/1926 | Udale et al. | 117—105.2 X |
| 2,464,568 | 3/1949 | Flynn et al. | |
| 2,537,433 | 1/1951 | Waring | 117—75 X |
| 2,607,983 | 8/1952 | McBride | 117—71 |
| 2,691,814 | 10/1954 | Tait | 117—75 X |
| 2,707,703 | 5/1955 | Dorst | 117—75 X |
| 2,765,728 | 10/1956 | Pearce | 126—39 X |
| 2,813,041 | 11/1957 | Mitchell et al. | 117—21 |
| 2,934,456 | 4/1960 | Schutt | 117—105 X |
| 2,943,951 | 7/1960 | Haglund | 117—46 X |
| 2,944,917 | 7/1960 | Cahne | 117—75 X |
| 3,008,601 | 11/1961 | Cahne | 117—132 X |
| 3,010,843 | 11/1961 | Eder | 117—105 X |
| 3,052,590 | 9/1962 | Maros et al. | 117—75 |

FOREIGN PATENTS

| | | |
|---|---|---|
| 227,037 | 2/1960 | Australia. |
| 554,916 | 3/1958 | Canada. |
| 719,383 | 12/1954 | Great Britain. |

MURRAY KATZ, *Primary Examiner.*

RICHARD D. NEVIUS, JOSEPH B. SPENCER, G. L. WELLS, *Assistant Examiners.*